(12) United States Patent
Kawashima

(10) Patent No.: US 12,352,614 B2
(45) Date of Patent: Jul. 8, 2025

(54) COMBINATION SCALE WITH PROTECTIVE COVER

(71) Applicant: YAMATO SCALE CO., LTD., Akashi (JP)

(72) Inventor: Takaaki Kawashima, Akashi (JP)

(73) Assignee: YAMATO SCALE CO., LTD., Akashi (JP)

( * ) Notice: Subject to any disclaimer, the term of this patent is extended or adjusted under 35 U.S.C. 154(b) by 427 days.

(21) Appl. No.: 17/916,402

(22) PCT Filed: Apr. 15, 2020

(86) PCT No.: PCT/JP2020/016557
§ 371 (c)(1),
(2) Date: Sep. 30, 2022

(87) PCT Pub. No.: WO2021/210092
PCT Pub. Date: Oct. 21, 2021

(65) Prior Publication Data
US 2023/0152145 A1 May 18, 2023

(51) Int. Cl.
*G01G 19/393* (2006.01)
*G01G 21/28* (2006.01)

(52) U.S. Cl.
CPC ........... *G01G 19/393* (2013.01); *G01G 21/28* (2013.01)

(58) Field of Classification Search
CPC ..... G01G 19/387; G01G 19/393; G01G 21/28
See application file for complete search history.

(56) References Cited

U.S. PATENT DOCUMENTS

| 4,714,151 A | 12/1987 | Campbell et al. |
| 4,812,701 A * | 3/1989 | Izumi ..................... G01G 21/30 312/285 |

(Continued)

FOREIGN PATENT DOCUMENTS

| CN | 108674925 A | 10/2018 |
| JP | 2007-85856 A | 4/2007 |

(Continued)

OTHER PUBLICATIONS

Computer translation of JP 2016-136, 126 downloaded from the JPO website on Jan. 25, 2025.*

*Primary Examiner* — Randy W Gibson
(74) *Attorney, Agent, or Firm* — Norris McLaughlin, P.A.

(57) ABSTRACT

A combination scale is provided that includes a plurality of weighing conveyers arranged in a row, a collection conveyer, and a protective cover. The weighing conveyers transports items to be weighed that are manually supplied. The collection conveyer transports the items discharged from the weighing conveyers along a direction of arrangement of the weighing conveyers. The protective cover is disposed on an outer side of transport-starting ends in a direction of transport of the weighing conveyers. The protective cover extends in the direction of arrangement of the weighing conveyers. The protective cover is supported in a manner that is rotatable to and from two positions; a closing position at which the protective cover faces the transport-starting ends in the direction of transport, and an opening position at which the protective cover is rotated outward.

11 Claims, 11 Drawing Sheets

(56) References Cited

U.S. PATENT DOCUMENTS

| | | | | | |
|---|---|---|---|---|---|
| 4,821,820 | A | * | 4/1989 | Edwards | G01G 19/393 177/1 |
| 5,621,194 | A | * | 4/1997 | Koyama | G01G 19/393 177/25.18 |
| 9,079,721 | B2 | * | 7/2015 | Kawanishi | B65G 43/08 |
| 9,459,134 | B2 | * | 10/2016 | Kawashima | G01G 11/12 |
| 2014/0027187 | A1 | * | 1/2014 | Kosaka | G01G 19/393 177/25.18 |
| 2014/0083816 | A1 | * | 3/2014 | Kawanishi | B65G 43/08 198/341.03 |
| 2021/0389170 | A1 | * | 12/2021 | Yamada | G01G 19/393 |
| 2023/0152146 | A1 | * | 5/2023 | Kawashima | G01G 19/393 177/145 |

FOREIGN PATENT DOCUMENTS

| | | |
|---|---|---|
| JP | 3174113 U | 3/2012 |
| JP | 2016-136126 A | 7/2016 |
| JP | 2018-066600 A | 4/2018 |

* cited by examiner

COMBINATION SCALE WITH PROTECTIVE COVER

TECHNICAL FIELD

This invention relates to a combination scale that weighs and combine target items to be weighed into a combination of items having a summed weight that falls within a predetermined range of weights and then discharges the items thus weighed and combined.

BACKGROUND ART

The combination scales may be roughly divided into three different types of scales; automatic scales, semiautomatic scales, and manually operated scales, in accordance with how items to be weighed are supplied to and discharged from their weighing units. The manually operated combination scales require manpower for both of the supply and discharge of the items. The semiautomatic combination scales receive items that are manually supplied and mechanically discharge the received items. In the automatic combination scales, both of the supply and discharge of items are automated without the need to rely on manpower.

The manually operated or semiautomatic combination scales may be selected for any items to be weighed and supplied that are difficult or unsuitable for automatic handling.

Patent Literature 1 describes an example of the semiautomatic combination scales of the known art. In this combination scale, weighing conveyers are horizontally arranged in a row and are manually supplied with items to be weighed. A combination of discharge-target weighing conveyers containing the items having a summed weight that falls within a given range of weights is selected through combinatorial computations executed based on weights of the items received by the weighing conveyers. The selected combination of weighing conveyers is driven to discharge the items into a collection conveyer, and the collection conveyer transports the items along the direction of arrangement of the weighing conveyers. With this collection conveyer, the items of a weight that falls within a given range of weights are transported and discharged into a packaging machine disposed in a later stage of the scale.

CITATION LIST

Patent Document

Patent Document 1: JP 2018-66600 A

SUMMARY OF THE INVENTION

Technical Problems

Such a semiautomatic combination scale may involve the risk that a person who operates the scale standing in front of the weighing conveyers accidentally contacts transport-starting ends of the conveyers. To avoid that, the combination scale of this type may be typically equipped with a cover for protection. This protective cover is disposed on the transport-starting side of the weighing conveyers and is coupled with screws to the body of the combination scale.

In the weighing conveyers and the protective cover are often left broken pieces or scraps of the items, for example, foodstuffs. The protective cover, therefore, should desirably be easily opened for cleaning.

As described earlier, the collection conveyer transports the items discharged from the weighing conveyers, and a control box containing a power supply unit and a control board is disposed at a position below this collection conveyer. The broken pieces or scraps of the items, while being delivered from the weighing conveyers into the collection conveyer, may possibly drop onto the upper surface of the control box and stay there.

Cleaning, which is naturally required of any combination scales used to handle and weigh foodstuffs, may remove such broken pieces or scraps of the items left on the upper surface of the control box. Yet, cleaning water used then may be often left on the control box, possibly posing hygiene-related risks.

This invention was accomplished to address these issues of the known art and is directed to providing a combination scale allowed to facilitate maintenance including cleaning.

Technical Solution

To this end, the present invention provides the following technical aspects.

1] A combination scale according to this invention includes: a plurality of weighing conveyers arranged in a row, the weighing conveyers transporting items to be weighed that are manually supplied; a collection conveyer that transports the items discharged from the weighing conveyers along a direction of arrangement of the weighing conveyers; and a protective cover disposed on an outer side of transport-starting ends in a direction of transport of the weighing conveyers, the protective cover extending in the direction of arrangement of the weighing conveyers. The protective cover is supported in a manner that is rotatable to and from a closing position and an opening position, the closing position being a position at which the protective cover faces the transport-starting ends in the direction of transport, the opening position being a position at which the protective cover is rotated outward.

In the combination scale according to this invention, the protective cover disposed for protection of the weighing conveyers is long in the direction of their arrangement and is accordingly relatively heavy. This protective cover, however, needs not be removed and readily opens and closes through simple rotations, facilitating maintenance of the combination scale including cleaning.

2] In a preferred embodiment of this invention, a plurality of groups of the weighing conveyers are disposed on both sides of the collection conveyer, and the plurality of groups of the weighing conveyers are each provided with the protective cover.

According to this embodiment, the collection conveyer may be reduced in length by having the weighing conveyers disposed on both sides of the collection conveyer. This may lead to the following advantages; reduction of time required to discharge the items, downsizing of the combination scale, and reduced length of the protective cover serving to cover the weighing conveyers. The protective cover thus reduced in length may be easier to handle.

3] In other embodiments of this invention, the protective cover is rotatably supported through a torque hinge.

According to this embodiment, the rotational resistance of the torque hinge alone may allow the protective cover to stay at the closing and opening positions. Thus, the protective cover may be easier to handle without the need to use any particular locking means.

4] In other embodiments of this invention, the combination scale further includes, at a position below the protective cover, a control box that rotatably supports the protective cover.

According to this embodiment, the control box is disposed at, instead of a position below the collection conveyer as in the known art, a position below the protective cover on the outer side of the transport-starting ends of the weighing conveyers. This leaves an unoccupied open space below the collection conveyer.

When the weighing conveyers are supplied with the items and the items in the weighing conveyers are delivered into the collection conveyer, any broken pieces or scraps of the items, if they fall from the weighing conveyers or the collection conveyer, may be likely to drop onto the floor surface. Thus, such broken pieces or scraps of the items and/or cleaning water may be unlikely to drop onto the upper surface of the control box and stay there, and the combination scale may be accordingly kept in a sanitary condition.

5] In other embodiments of this invention, the upper surface of the control box is an inclined surface inclining downward toward an outer side of the control box.

According to this embodiment, cleaning water is guided downward along the inclined upper surface of the control box and then finally discharged. Thus, cleaning water may be unlikely to remain on the upper surface of the control box, and the combination scale may be accordingly kept in a sanitary condition.

6] In other embodiments of this invention, an interval is formed between an upper outer edge of the control box and the protective cover at the opening position.

When the protective cover is shifted to the opening position to start cleaning, cleaning water used then may be allowed to smoothly run downward through the interval between the protective cover at the opening position and the upper part of the control box. Thus, the cleaning work may be performed more efficiently.

7] In other embodiments of this invention, the protective cover includes a plurality of display lights each used for a respective one of the weighing conveyers.

According to this embodiment, the display lights for all of weighing conveyers are collectively disposed in the protective cover. This may simplify a wiring work and facilitate a waterproof treatment, as compared with the display lights being disposed alongside the weighing conveyers.

Effects of the Invention

As described thus far, the combination scale according to this invention is equipped with the protective cover for the weighing conveyers. This protective cover needs not be removed and readily opens and closes through simple rotations. This may facilitate maintenance of the combination scale including cleaning

DESCRIPTION OF EMBODIMENTS

Embodiments of this invention are hereinafter described in detail with reference to the accompanying drawings.

Figure 1:
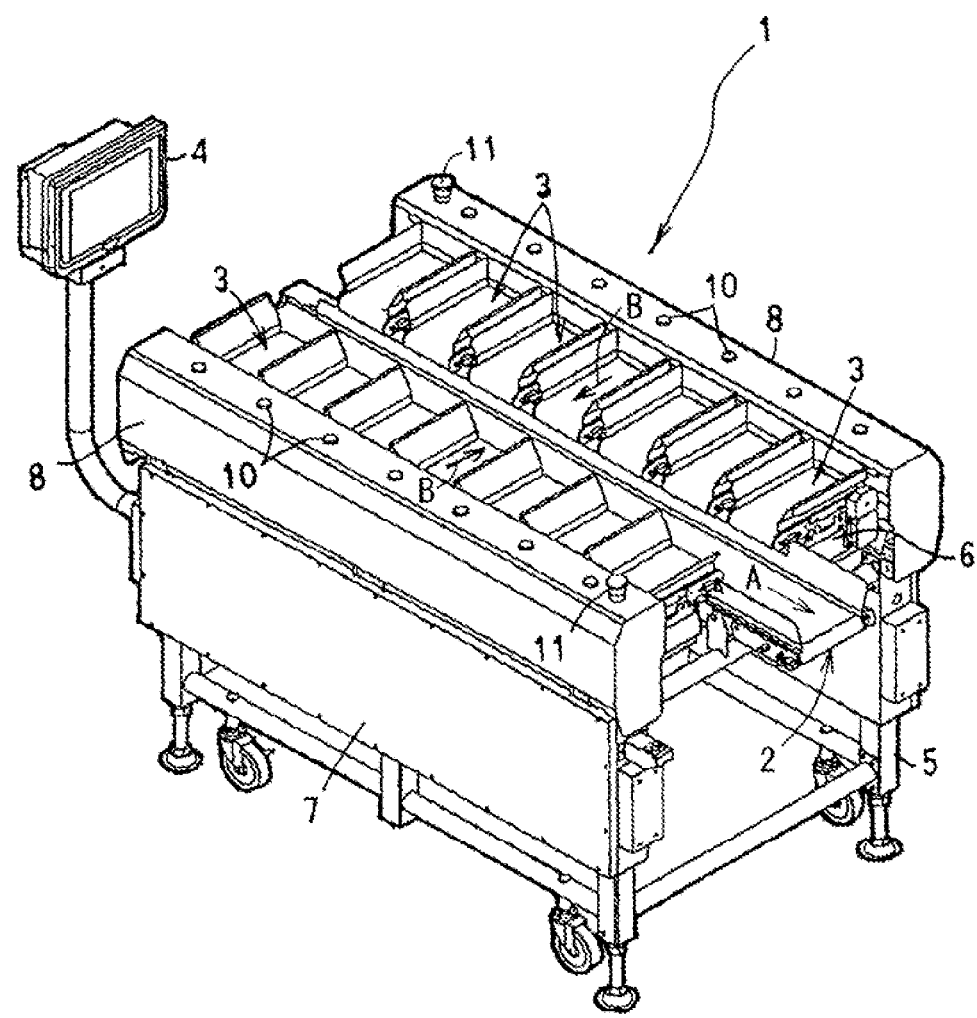
FIG. 1 is a perspective view of a combination scale according to an embodiment of this invention.
Figure 2:
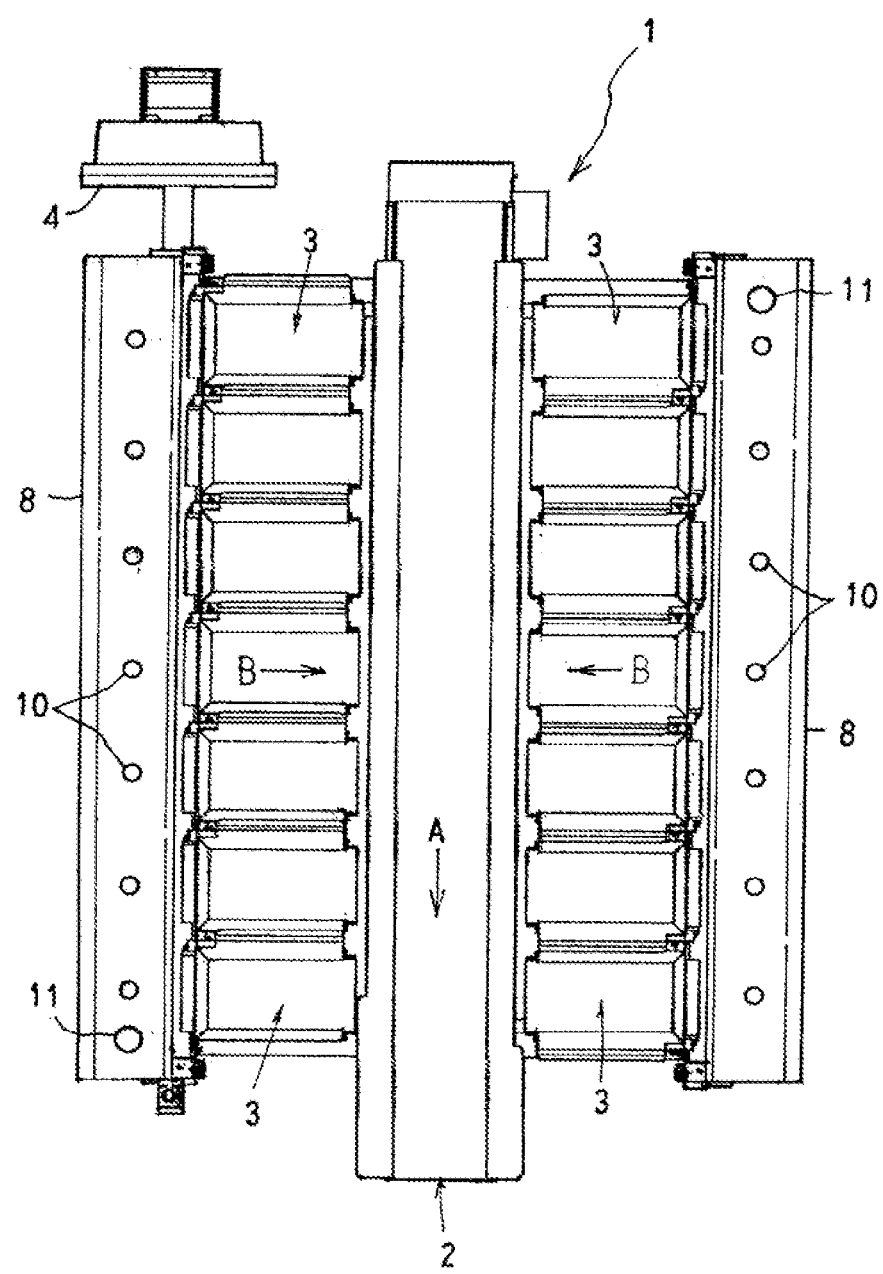
FIG. 2 is a plan view of the combination scale illustrated in FIG. 1.
Figure 3:
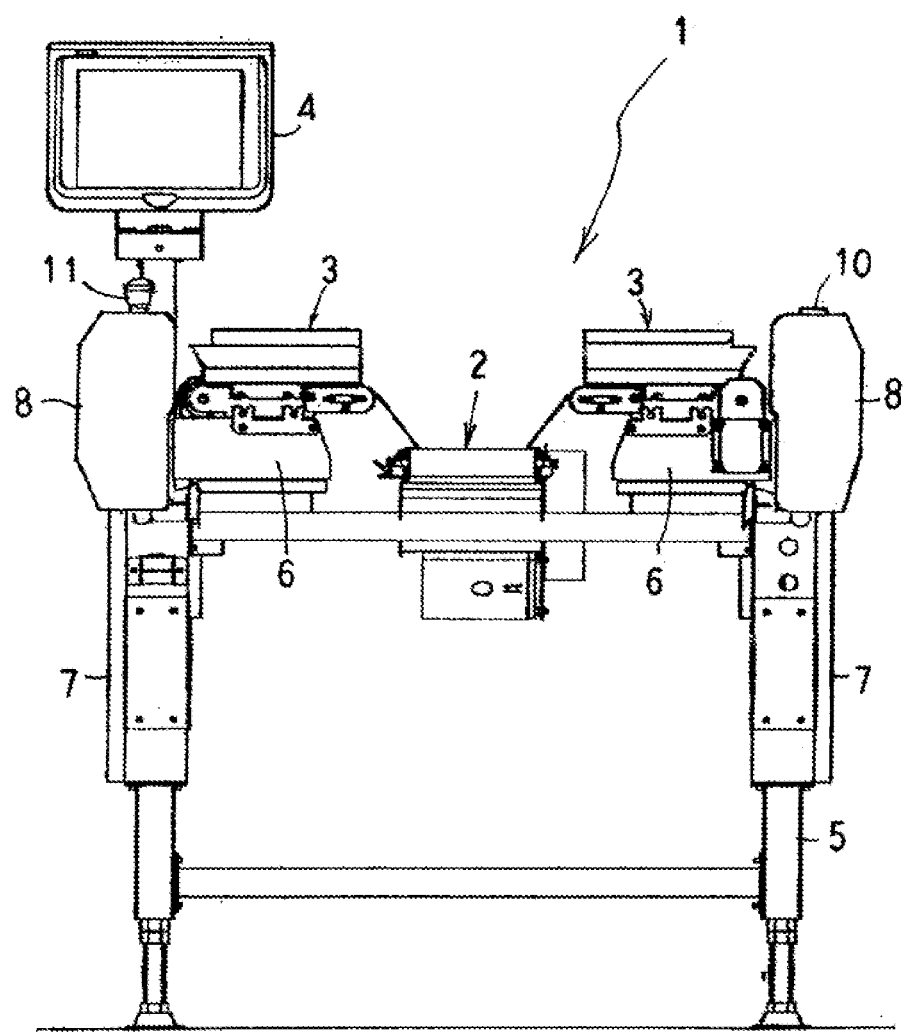
FIG. 3 is a front view of the combination scale illustrated in FIG. 1.

FIG. 1 is a perspective view of a combination scale 1 according to an embodiment of this invention. FIG. 2 is a plan view of the combination scale. FIG. 3 is a front view of the combination scale.

The combination scale 1 according to this embodiment is a semiautomatic combination scale. An operator manually supplies this combination scale with items to be weighed, and the combination scale mechanically discharges the items having a weight that falls within a predetermined range of weights. The combination scale 1 includes a collection conveyer 2, a plurality of weighing conveyers 3, an operation setting displayer 4 of touch panel type, and a pedestal 5. The collection conveyer 2 includes a belt conveyer that transports the items in a direction of transport A. The weighing conveyers 3 each including a belt conveyer are arranged in rows on both sides of the collection conveyer 2. The operation setting displayer 4 displays thereon operation statuses and parameter settings for operation control of the combination scale 1. These devices are supported by the pedestal 5.

The collection conveyer 2 transports the items having a weight that falls within a predetermined range of weights and that have been discharged from the weighing conveyers 3. The collection conveyer 2 then discharges the items into a packaging machine disposed in a later stage of the scale. The discharged items will be packed into bags in the packaging machine.

The weighing conveyers 3 arranged in two rows; seven weighing conveyers in each row in the illustrated example, are disposed as weight measuring units on lateral sides of the collection conveyer 2 along the direction of transport of this conveyer. The weighing conveyers 3 of the respective rows are linearly arranged on both sides of the collection conveyer 2. The weighing conveyers 3 transport the items in a direction of transport B orthogonal to the direction of transport A of the collection conveyer 2.

The weighing conveyers 3 are detachably supported by load measuring units 6 arranged in rows in an upper part of the pedestal 5. The weight of the weighing conveyer containing the items is detected by a weight sensor, like a load cell, embedded in the load measuring unit 6, and the detected weight is transmitted to a controller not illustrated in the drawings. The weighing conveyer 3 is driven by a driving motor embedded in the load measuring unit 6.

An operator manually feeds the items into the empty weighing conveyers 3 currently inactive. The weight of each weighing conveyer 3 is detected by the weight sensor. Based on the detection output of the weight sensor, the controller not illustrated in the drawings obtains weight values of the items and executes combinatorial computations. The combinatorial computations variously combine the weights of the items in the weighing conveyers 3 and then select, as discharge-target weighing conveyers, a combination of weighing conveyers having a summed weight that falls within a predetermined range of weights. In case there are two or more combinations of discharge-target weighing hoppers having a summed weight that falls within a predetermined range of weights, one of the combinations is selected that has a smallest absolute value of a difference between the obtained combined weight and a target combined weight. The items in the weighing conveyers 3 selected for discharge are transported and discharged onto the collection conveyer 2 by the weighing conveyers 3. The items on the collection conveyer 2 are then transported out of the collection conveyer 2 into the packaging machine.

For clear and easy understanding of what is described herein, the following directions are hereinafter defined as; "lateral direction" as the direction of arrangement of the weighing conveyers 3 (longitudinal direction of the collection conveyer 2), and "front-back direction" as the longitudinal direction of the weighing conveyers 3.

Control boxes 7 are disposed at positions outward and below the weighing conveyers 3 on both sides of the collection conveyer 2, i.e., at positions on the outer side of transport-starting ends in the direction of transport of the weighing conveyers 3. The control boxes 7 are supported by the pedestal 5 and these control boxes each include a power supply unit and a control board. By thus having the control boxes 7 disposed outward and below the weighing conveyers 3 on both sides of the collection conveyer 2, there is an unoccupied open space below the collection conveyer 2.

Thus, any broken pieces or scraps of the items, if they fall from the weighing conveyers 3 or the collection conveyer 2, may be invited to drop onto the floor surface. Such broken pieces or scraps of the items and/or cleaning water may be unlikely to stay on the upper surface of the control box, and the combination scale may be kept in a sanitary condition.

The open space left unoccupied below the collection conveyer 2 and the load measuring units 6 may offer a large working area for maintenance and cleaning of the collection conveyer 2.

Long protective covers 8 are attached to upper parts of the respective control boxes 7 to cover these control boxes. The protective covers 8 are located between the weighing conveyer 3 and an operator who manually supplies the weighing conveyers 3 with the items to be weighed. These protective covers, therefore, may successfully prevent accidental contact of the operator with a driving unit or transport-starting end of the weighing conveyer 3. This may avoid the risk of errors in weighing the items using the weighing conveyers 3 and may also ensure an improved safety.

Figure 4:
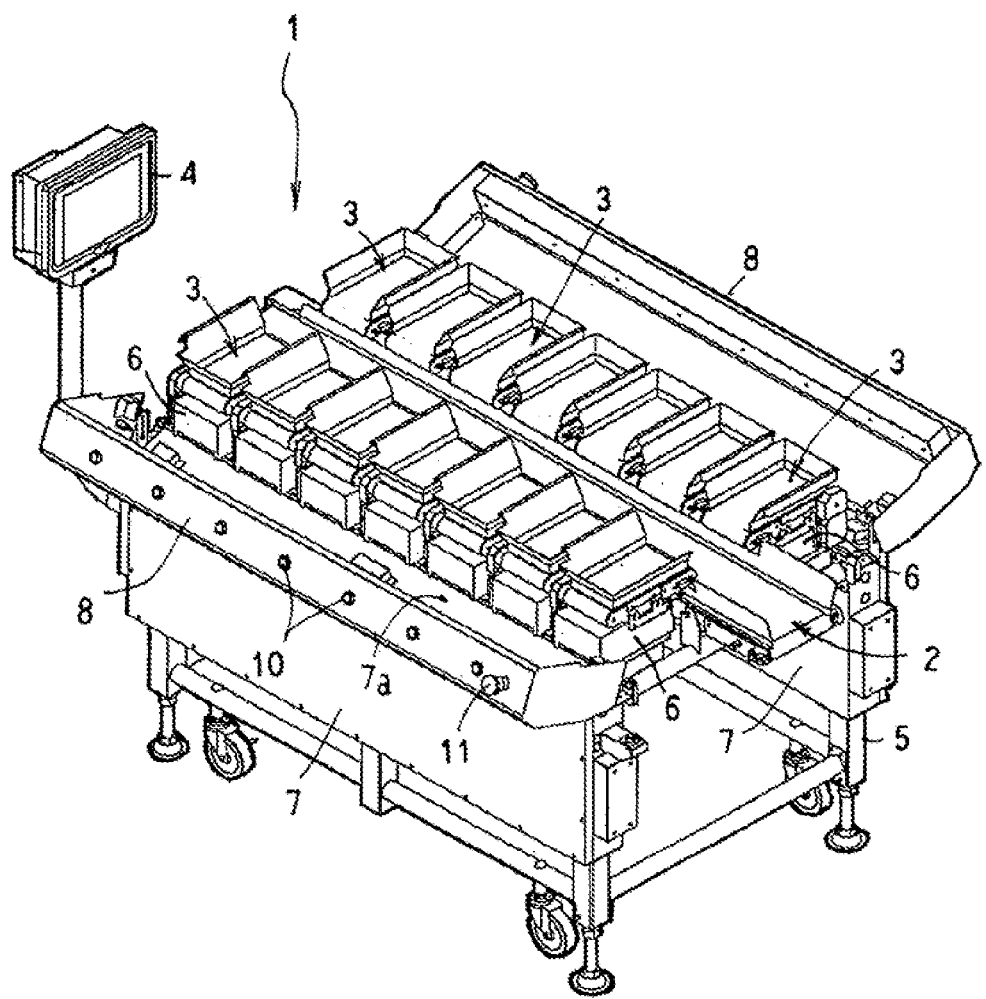
FIG. 4 is a perspective view of the combination scale when protective covers are opened.
Figure 5:
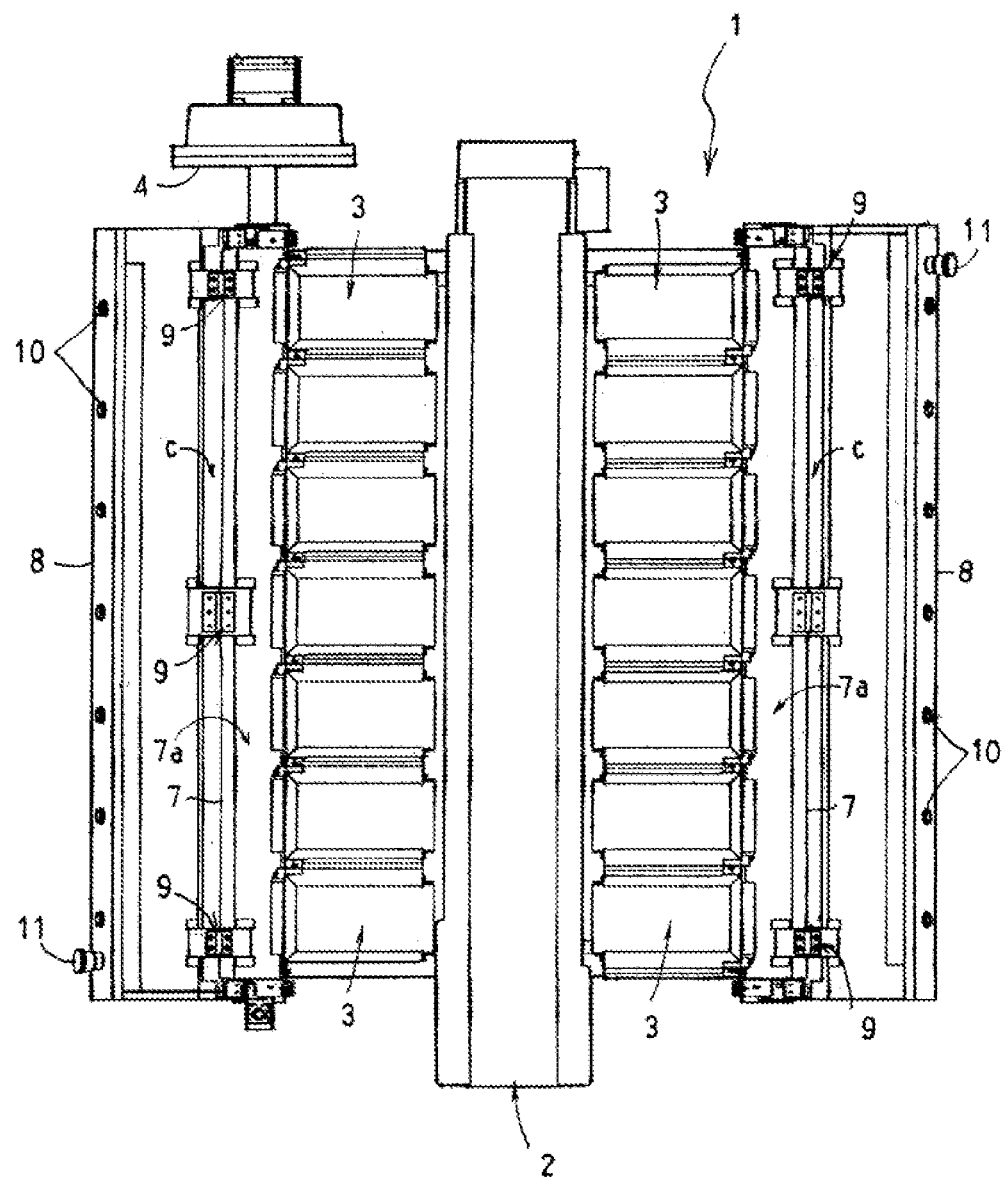
FIG. 5 is a plan view of the combination scale when the protective covers are opened.
Figure 6:
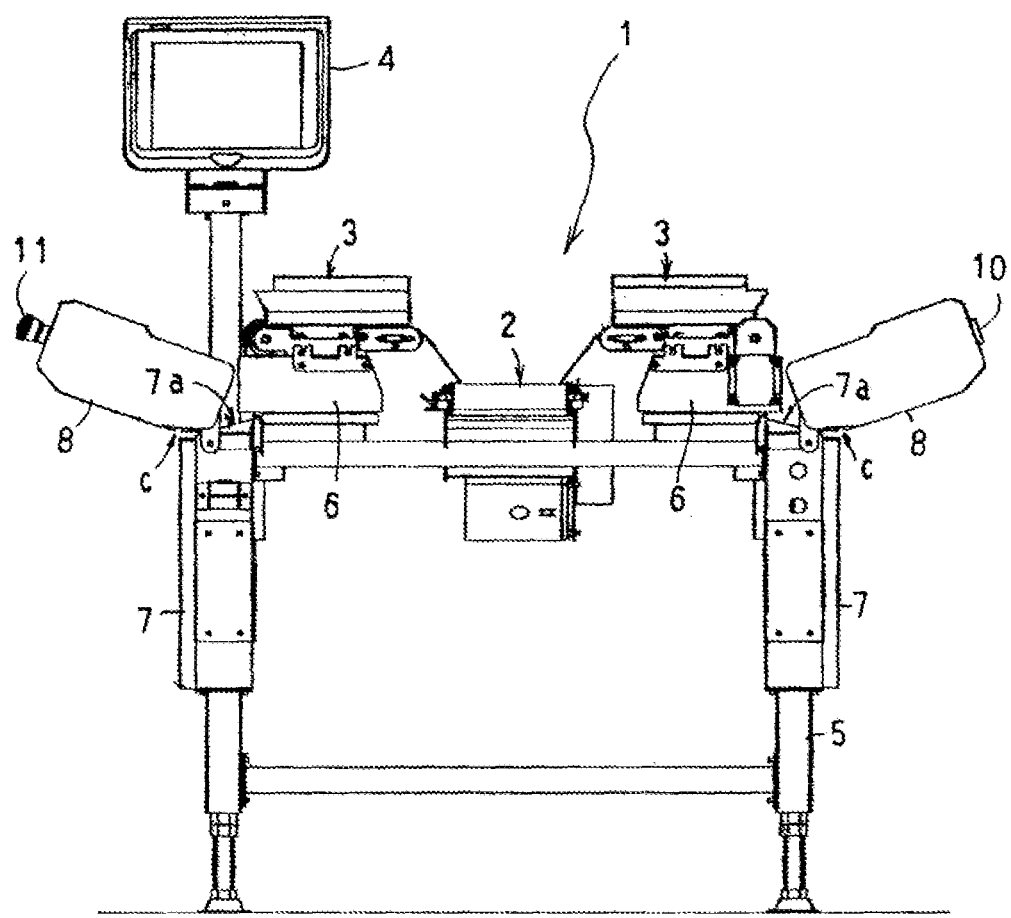
FIG. 6 is a front view of the combination scale when the protective covers are opened.

FIG. 4 is a perspective view of the combination scale 1 when the protective covers 8 are opened. FIG. 5 is a plan view of the combination scale 1 when the protective covers 8 are opened. FIG. 6 is a front view of the combination scale 1 when the protective covers 8 are opened.

As illustrated in FIG. 5, the protective covers 8 are attached rotatably and supportably to the upper parts of the control boxes 7 through a plurality of hinges 9. As illustrated in FIGS. 1 to 3, the protective covers 8 are each allowed to shift to and from a closing position and an opening position. At the closing position, the protective cover is pulled upward to close. At the opening position, the protective cover is rotated downward and outward to open (away from the collection conveyer 2 at the center). The protective cover 8 at the closing position is close to and facing the transport-starting ends in the direction of transport of the weighing conveyers 3. The protective cover 8 at the opening position exposes its inner surface and also exposes the load measuring units 6 and the transport-starting ends in the direction of transport of the weighing conveyers 3.

The hinge 9 is a torque hinge that imparts an appropriate level of resistance to the rotation of the protective cover 8. The protective covers 8 using such torque hinges may be allowed to stay at both of the closing and opening positions in a stable manner.

By having the protective covers 8 rotated outward and kept at the opening positions, The side plates of the control boxes 7 are allowed to fit in and out of these boxes from the outer side.

The protective covers 8 have, on their upper surfaces, display lights 10 that are disposed correspondingly to the weighing conveyers 3. Further, the protective covers 8 each have an emergency stop button 11. The display light 10 notifies the operator that the items in the relevant weighing conveyer 3 have a weight beyond a range of optimal weights, inviting the operator to resupply or change the items. These display lights 10 and the emergency stop buttons 11 are waterproofed and then connected to the control boxes 7.

The protective covers 8 are kept at the closing positions during the normal operation but are opened when cleaning starts. Then, the weighing conveyers 3 are removed to wash off any broken pieces and scraps of the items. The control boxes 7 each have an upper surface 7a inclining downward toward the outer side, as illustrated in FIG. 6. Further, an interval c for water drainage is formed between the opened protective cover 8 and an outer edge in the upper part of each control box 7, as illustrated in FIGS. 5 and 6. Thus, cleaning water may be guided to run outward and downward along the inclining upper surface 7a of the control box 7 to be finally discharged through the interval c. This may avoid the risk of the cleaning water being left on the upper surface 7a of the control box 7.

Next, structural features of the weighing conveyers 3 are described below.

Figure 7:
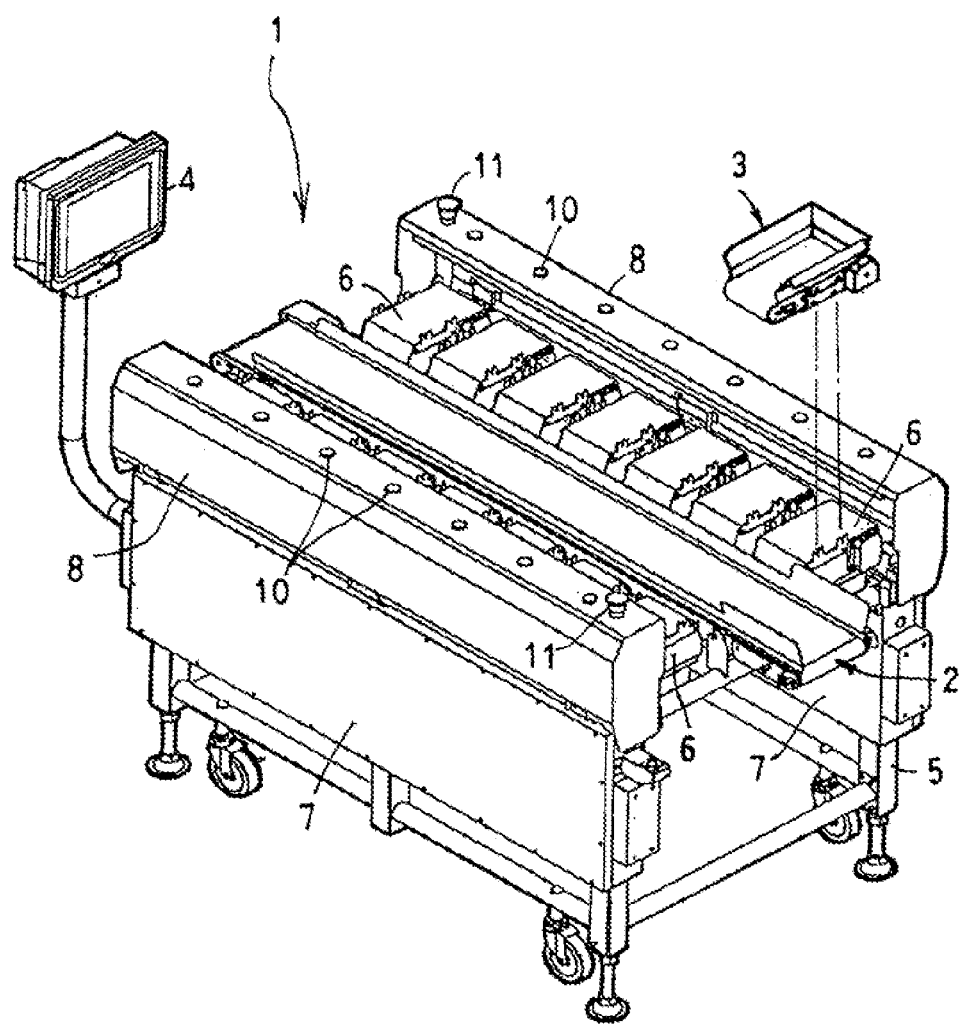
FIG. 7 is a perspective view of the combination scale from which weighing conveyers have been removed.
Figure 8:
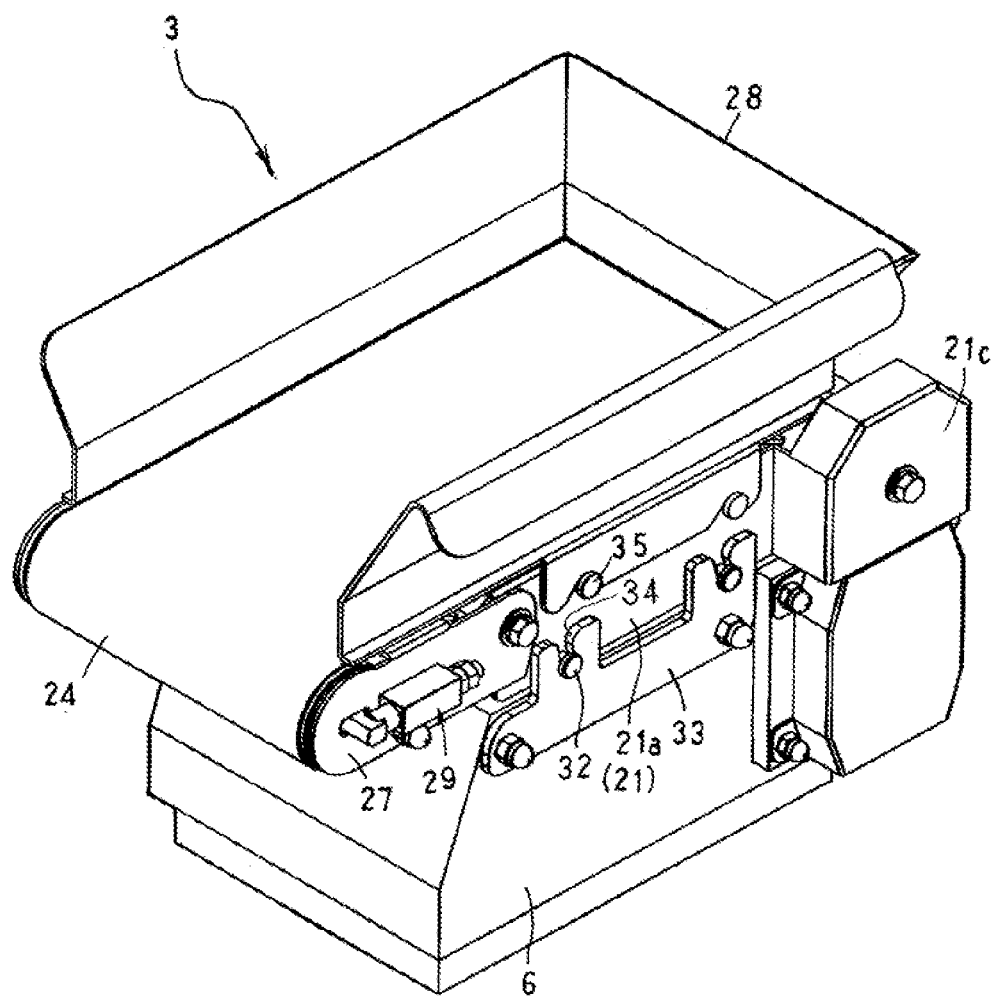
FIG. 8 is a perspective view of the weighing conveyer.
Figure 9:
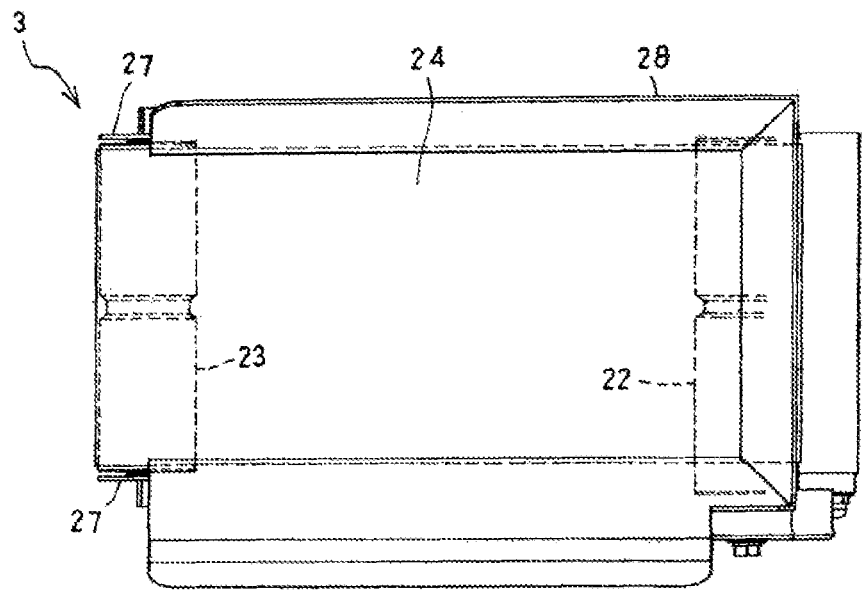
FIG. 9 is a plan view of the weighing conveyer.
Figure 10:
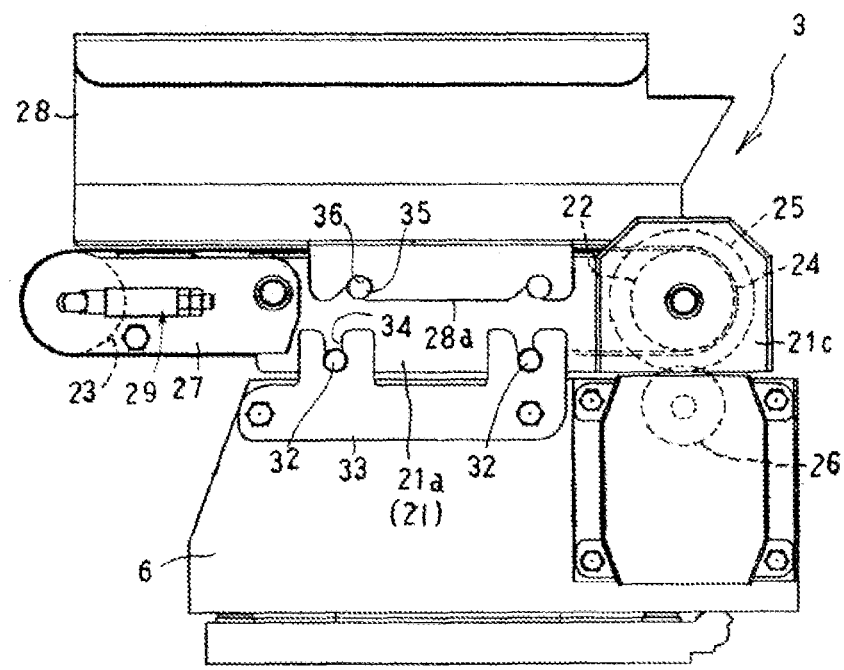
FIG. 10 is a side view of the weighing conveyer.
Figure 11:
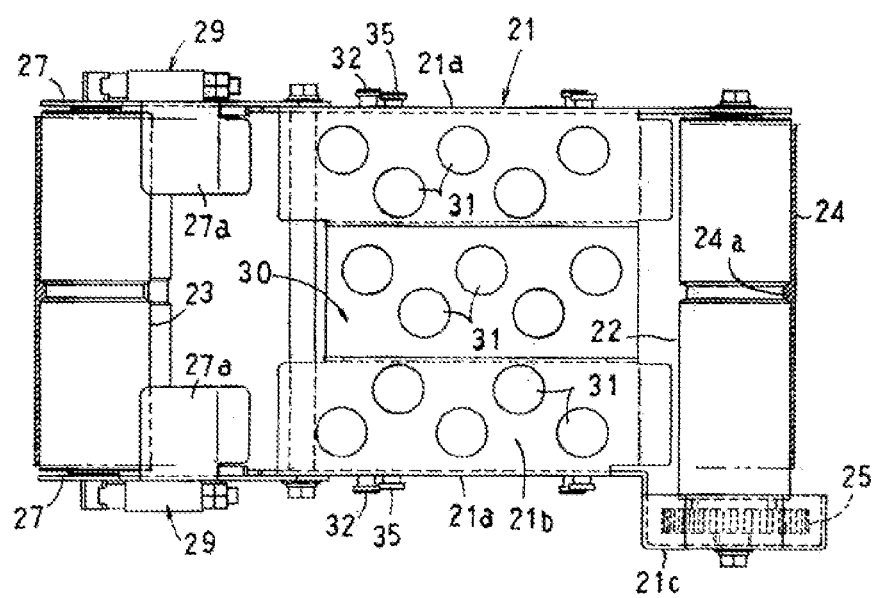
FIG. 11 is a plan view of conveyer frames in the weighing conveyers.
Figure 12:
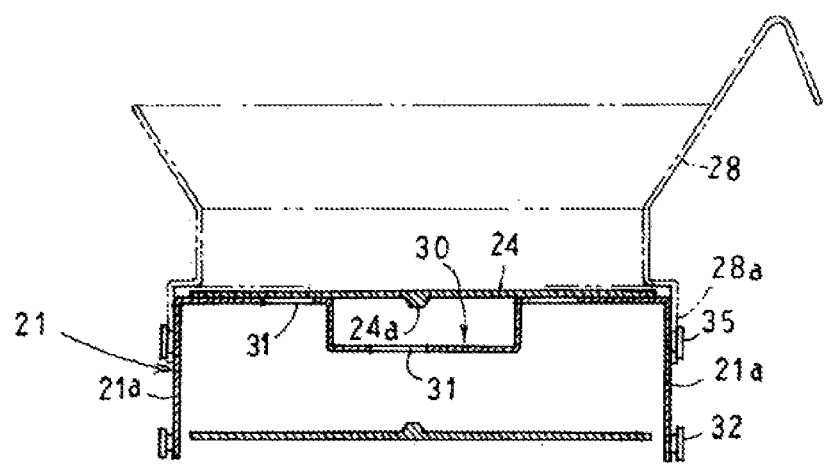
FIG. 12 is a longitudinal front view of the conveyer frame.
Figure 13:
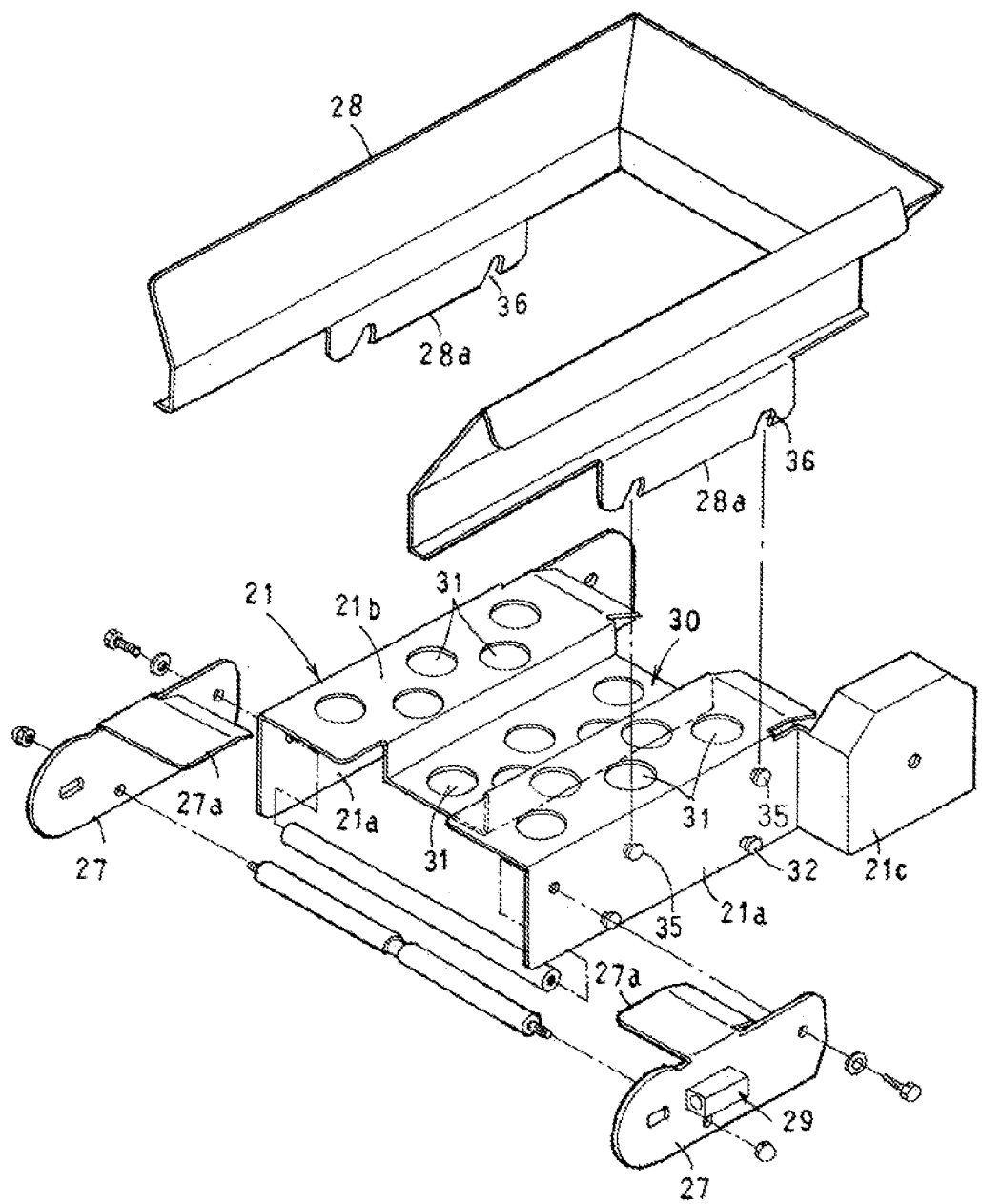
FIG. 13 is an exploded perspective view of the conveyer frame.

FIG. 7 is a perspective view of the combination scale 1 from which the weighing conveyers 3 have been removed. FIG. 8 is a perspective view of the weighing conveyer 3. FIG. 9 is a plan view of the weighing conveyer 3. FIG. 10 is a side view of the weighing conveyer 3. FIG. 11 is a plan view of conveyer frames 21 in the weighing conveyers 3. FIG. 12 is a longitudinal front view of the conveyer frame 21. FIG. 13 is an exploded perspective view of the conveyer frame 21.

The weighing conveyer 3 has a driving roller 22, a tension roller 23, and a wide conveyer belt 24. The driving roller 22 is pivotally supported on the transport-starting side in the direction of transport of the conveyer frame 21. The tension roller 23 is pivotally supported on the transport-ending side in the direction of transport of the conveyer frame 21. The conveyer belt 24 is wound around the driving roller 22 and the tension roller 23.

A driven gear 25 is coupled to one end of the driving roller 22, as illustrated in FIGS. 10 and 11. This driven gear 25 is meshed, from the upper side, with a driving gear 26 of the load measuring unit 6. The driving gear 26 is interlocked with a driving motor housed in the load measuring unit 6, though not illustrated in the drawings. The driving gear 26 is exposed upward in an upper part of the load measuring unit 6.

As illustrated in FIG. 13, the conveyer frame 21 includes a top plate 21b and a pair of side plates 21a facing each other. The side plates 21a and the top plate 21b are made of metallic, plate-shaped materials, for example, stainless steel and are integrally formed by press working. The driving roller 22 is disposed across the side plates 21a at one end (rear end) of the conveyer frame 21 and is pivotally supported in a freely rotatable manner. The tension roller 23 is disposed across bearing brackets 27 coupled to the side plates 21a at the other end of the conveyer frame 21 and is pivotally supported in a freely rotatable manner. The tension roller 23 is also slidably and elastically biased outward by a spring-embedded tension mechanism 29. An item-feeding guide 28 is detachably mounted to the conveyer frame 21. The item-feeding guide 28 serves to prevent the items from falling off the conveyer and is so shaped that extends substantially upright on both sides in the direction of width of the conveyer belt 24 and on the transport-starting side in the direction of transport.

The driving roller 22 and the tension roller 23, though their detailed structural features are not illustrated in the drawings, are supported through bearings in a freely rotatable manner by support shafts inserted along their shaft centers. Both ends of the support shaft of the driving roller 22 are secured to the side plates 21a of the conveyer frame 21. The support shaft of the tension roller 23 is inserted through and supported by the bearing bracket 27 in a manner that the support shaft is slidable back and forth but is not rotatable.

A gear housing 21c containing the driven gear 25 of the driving roller 22 is formed continuous to one end of one of the side plates 21a of the conveyer frame 21. This gear housing 21c has such a protruding shape that covers and hides the driven gear 25 from the outer side and also from the upper side. The gear housing 21c has an open lower end, so that a lower end of the driven gear 25 is allowed to mesh with an exposed upper end of the driving gear 26.

The top plate 21b of the conveyer frame 21, through sliding contact, guides a transport-side inner peripheral surface of the conveyer belt 24. The top plate 21b has a groove 30 formed along its entire length at a laterally middle position. As illustrated in FIGS. 11 and 12, the conveyer belt 24 has, on its inner peripheral surface, a guiding projection 24a formed to prevent meandering movements. The groove 30 serves to avoid any interference with this guiding projection 24a and also serves as a rib for better rigidity of the whole conveyer frame 21.

From each of the bearing brackets 27 is extended a cantilever-type belt guide 27a to prevent sagging of the conveyer belt 24 between the tension roller 23 and the top plate 21b.

The top plate 21b of the conveyer frame 21 has a plurality of circular openings 31 formed in a staggered manner. The formation of such openings achieves two objects; reduction of the area of contact of the top plate 21b with the conveyer belt 24 for less sliding resistance, and reduction of the weight of the whole conveyer belt 24.

The openings 31 are formed by punching the top plate 21b from its surface side. This may form rounded surfaces at surface-side opening edges that slide along and contact the belt conveyer 24, eliminating the need to chamfer these opening edges.

At lower positions on the outer surface of each side plate 21a of the conveyer frame 21 are disposed headed coupling pins 32 that are paired on the front and back sides of this frame. The coupling pins 32 are insertable and removable, from the upper side, in and out of engaging grooves 34 of coupling fittings 33 vertically mounted to outer side surfaces of the load measuring unit 6. The conveyer frame 21 is inserted into between the coupling fittings 33, and the coupling pins 32 are slightly forced into the engaging grooves. As a result, the weighing conveyer 3 is positionally fixed in front-back and right-left directions and securely fitted to the load measuring unit 6.

This may cause the driven gear 25 of the driving roller 22 to mechanically mesh with the driving gear 26, in response to which the weighing conveyer 3 can be driven to operate. By having the conveyer frame 21 pulled upward out of the coupling fittings 33, the weighing conveyer 3 is separable from the weight measuring unit 6, and interlocking with the driving gear 26 is automatically released.

At upper positions on the outer surface of each side plate 21a of the conveyer frame 21 are disposed headed coupling pins 35 that are paired on the front and back sides of this frame. The coupling pins 35 are insertable and removable, from the lower side, in and out of engaging grooves 36 of coupling sides 28a extending downward from lateral lower ends of the item-feeding guides 28. The side plates 21a are pushed into between the coupling sides 28a, and the coupling pins 35 are forced into the engaging grooves 36. As a result, the item-feeding guides 28 are positionally fixed in front-back and right-left directions and securely fitted to the conveyer frame 21.

According to this embodiment, the protective covers 8 for a plurality of weighing conveyers 3 arranged in rows have a long dimension in the direction of arrangement and are accordingly relatively heavy. These protective covers, however, need not be removed and readily open and close through simple rotations. These protective covers are rotated to and kept at the opening positions for maintenance like cleaning and are rotated back to the closing positions when the maintenance is over. Thus, maintenance including cleaning may be facilitated.

Unlike the known art, the control box is not disposed below the collection conveyer 2, which leaves an unoccupied open space there. Any broken pieces or scraps of the items, if they fall out of the conveyers, may be likely to drop onto the floor surface. Thus, such broken pieces or scraps of the items and/or cleaning water may be unlikely to drop onto the upper surface of the control box and stay there, and the combination scale may be accordingly kept in a sanitary condition.

OTHER EMBODIMENTS

The scope of this invention may further include the following aspects.

1] The weighing conveyers 3 may be disposed on one side alone of the collection conveyer 2.

2] The protective covers 8 may be rotatably supportable using a simple and typical hinge and may also be retainable at the closing positions using a self-lock mechanism. This instance, however, requires some kind of unlocking means to open the protective covers 8.

3] In the earlier embodiment, side plates of the control box 7 are removable when the protective covers 8 are rotated to a large degree and kept at the opening positions. The protective covers 8 may be rotatable further downward and outward than described herein, in which case maintenance of the weighing conveyers 3 may be successfully performed without any interference of the protective covers 8.

4] In case the combination scale has a greater number of weighing conveyers 3, significantly increasing a region to be protected by the protective covers 8, the protective covers 8 may be each divided in its longitudinal direction into two or more portions.

5] In the earlier embodiment, the protective covers 8 are rotated upward to close and rotated downward to open. In case a large working space is available around the combination scale, the protective covers 8 may be each structured to open and close through rotations around a longitudinal point of support at one end of the cover. In this instance, an operator may be able to more readily open and close the protective covers 8 without the need to bear the weights of these covers.

REFERENCE SIGNS LIST

1 combination scale
2 collection conveyer
3 weighing conveyer
6 load measuring unit
7 control box
8 protective cover
9 hinge
10 display light
c interval

The invention claimed is:

1. A combination scale, comprising:
a plurality of weighing conveyers arranged in a row, the weighing conveyers transporting items to be weighed that are manually supplied;
a collection conveyer that transports the items discharged from the weighing conveyers along a direction of arrangement of the weighing conveyers; and
a protective cover disposed on an outer side of transport-starting ends in a direction of transport of the weighing conveyers, the protective cover extending in the direction of arrangement of the weighing conveyers,
the protective cover being supported in a manner that is rotatable to and from a closing position and an opening position, the closing position being a position at which the protective cover faces facing the transport-starting ends in the direction of transport, the opening position being a position at which the protective cover is rotated outward.

2. The combination scale according to claim 1, comprising a plurality of groups of the weighing conveyers that are disposed on both sides of the collection conveyer, wherein the plurality of groups of the weighing conveyers are each provided with the protective cover.

3. The combination scale according to claim 1, wherein the protective cover is rotatably supported through a torque hinge.

4. The combination scale according to claim 2, wherein the protective cover is rotatably supported through a torque hinge.

5. The combination scale according to claim 1, further comprising a control box at a position below the protective cover, wherein
the control box is allowed to rotatably support the protective cover.

6. The combination scale according to claim 2, further comprising a control box at a position below the protective cover, wherein
the control box is allowed to rotatably support the protective cover.

7. The combination scale according to claim 3, further comprising a control box at a position below the protective cover, wherein
the control box is allowed to rotatably support the protective cover.

8. The combination scale according to claim 4, further comprising a control box at a position below the protective cover, wherein
the control box is allowed to rotatably support the protective cover.

9. The combination scale according to claim 1, wherein an upper surface of the control box is an inclined surface inclining downward toward an outer side of the control box.

10. The combination scale according to claim 1, wherein an interval is formed between an upper outer edge of the control box and the protective cover at the opening position.

11. The combination scale according to claim 1, wherein the protective cover comprises a plurality of display lights each used for a respective one of the weighing conveyers.

* * * * *